United States Patent
Jelinek

(10) Patent No.: US 11,159,017 B2
(45) Date of Patent: *Oct. 26, 2021

(54) PERSONAL POWER PLANT SYSTEM AND METHODS OF INVERSE ENERGY GENERATION

(71) Applicant: EKERGY LLC, Irvine, CA (US)

(72) Inventor: Howard John Jelinek, Laguna Beach, CA (US)

(73) Assignee: EKERGY LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/426,838

(22) Filed: May 30, 2019

(65) Prior Publication Data

US 2020/0067347 A1 Feb. 27, 2020

Related U.S. Application Data

(63) Continuation of application No. 16/113,106, filed on Aug. 27, 2018, now Pat. No. 10,326,305.

(51) Int. Cl.
*H02J 3/00* (2006.01)
*H02J 13/00* (2006.01)
(Continued)

(52) U.S. Cl.
CPC ............ *H02J 3/003* (2020.01); *G05B 13/026* (2013.01); *H02J 3/32* (2013.01); *H02J 7/0068* (2013.01);
(Continued)

(58) Field of Classification Search
CPC .. H02J 13/0017; H02J 13/0075; H02J 7/0068; H02J 3/32; H02J 3/003;
(Continued)

(56) References Cited

U.S. PATENT DOCUMENTS 7,196,494 B2   3/2007   Baumgartner
7,683,576 B2   3/2010   Tien et al.
(Continued)

FOREIGN PATENT DOCUMENTS

EP      2712045 A2        3/2014
WO    WO 2016/041422 A1   3/2016
(Continued)

OTHER PUBLICATIONS

International Search Report and Written Opinion dated Sep. 10, 2019 for International Application No. PCT/US2019/045226, 10 pages.

*Primary Examiner* — Hien D Khuu
(74) *Attorney, Agent, or Firm* — Knobbe, Martens, Olson & Bear, LLP

(57) ABSTRACT

A personal power plant stores energy at the load site from renewable sources and through connection with a utility, enabling the personal power plant to support real time or near real time system load balancing and to eliminate net-metering. The personal power plant determines a charging profile based on predicted energy usage for a next 24-hour period. The personal power plant can provide an indication of the excess amount of electrical energy stored, but not needed for the next 24-hour period. When times of high demand are anticipated, the utility can reallocate energy to other users which it would otherwise provide to participating personal power plants aggregating the excess energy from a plurality of personal power plants. At such times, inverse power generation occurs as the personal power plants do not draw power from the grid which, in aggregation, reduces grid load.

16 Claims, 11 Drawing Sheets

(51) Int. Cl.
*G05B 13/02* (2006.01)
*H02J 7/00* (2006.01)
*H02J 3/32* (2006.01)
*H02J 3/38* (2006.01)

(52) U.S. Cl.
CPC ...... *H02J 13/0017* (2013.01); *H02J 13/0075* (2013.01); *H02J 3/382* (2013.01); *H02J 7/0021* (2013.01); *H02J 7/0048* (2020.01); *H02J 2203/20* (2020.01)

(58) Field of Classification Search
CPC ...... H02J 7/0048; H02J 2203/20; H02J 3/382; H02J 7/0021; H02J 3/381; H02J 2300/20; G05B 13/026; Y04S 40/126; Y04S 10/123; Y04S 10/50; Y04S 40/20; Y04S 10/14; Y02E 70/30
See application file for complete search history.

(56) References Cited

U.S. PATENT DOCUMENTS

| | | | |
|---|---|---|---|
| 8,164,305 B2 | 4/2012 | Zhang et al. | |
| 8,228,034 B2 | 6/2012 | Guatto et al. | |
| 8,463,449 B2 | 6/2013 | Sanders | |
| 8,917,061 B2 | 12/2014 | Zhu | |
| 8,963,499 B2 | 2/2015 | Choi | |
| 9,130,377 B2 | 9/2015 | Barsukov et al. | |
| 9,136,726 B2 | 9/2015 | Shinozaki | |
| 9,293,923 B2* | 3/2016 | Kim | H02J 3/28 |
| 9,610,854 B2* | 4/2017 | Nazarian | H02M 7/68 |
| 9,692,234 B2 | 6/2017 | Mammoli et al. | |
| 9,748,765 B2 | 8/2017 | Huang et al. | |
| 9,893,385 B1 | 2/2018 | Nayar et al. | |
| 9,979,211 B2 | 5/2018 | Barsukov et al. | |
| 10,044,069 B2 | 8/2018 | Despesse | |
| 10,326,305 B1* | 6/2019 | Jelinek | G05B 13/026 |
| 10,615,610 B1 | 4/2020 | Jelinek | |
| 10,910,846 B2 | 2/2021 | Jelinek | |
| 2003/0160593 A1 | 8/2003 | Yau et al. | |
| 2011/0068746 A1 | 3/2011 | Rocci et al. | |
| 2012/0126621 A1 | 5/2012 | Brownlee | |
| 2012/0143385 A1* | 6/2012 | Goldsmith | H02J 3/38 700/297 |
| 2012/0153722 A1* | 6/2012 | Nazarian | B60L 53/62 307/23 |
| 2012/0245744 A1* | 9/2012 | Prosser | H02J 3/32 700/286 |
| 2013/0262197 A1 | 10/2013 | Kaulgud et al. | |
| 2014/0067151 A1 | 3/2014 | Ebhart et al. | |
| 2014/0079960 A1 | 3/2014 | Yun | |
| 2015/0039145 A1* | 2/2015 | Yang | G05B 13/02 700/291 |
| 2016/0070249 A1* | 3/2016 | Debone | H02J 3/14 700/296 |
| 2016/0226250 A1* | 8/2016 | Fukubayashi | H02J 3/32 |
| 2017/0170684 A1 | 6/2017 | Matthey | |
| 2017/0214245 A1* | 7/2017 | Nazarian | B60L 50/52 |
| 2017/0214349 A1 | 7/2017 | Priem | |
| 2018/0034285 A1 | 2/2018 | Baumgartner et al. | |
| 2018/0226797 A1 | 8/2018 | Galin et al. | |
| 2018/0233914 A1 | 8/2018 | Miki et al. | |
| 2019/0011970 A1* | 1/2019 | Youn | G06F 1/3212 |
| 2019/0036340 A1 | 1/2019 | Meeker et al. | |
| 2020/0083711 A1* | 3/2020 | Kanou | H02J 3/38 |

FOREIGN PATENT DOCUMENTS

| | | |
|---|---|---|
| WO | WO 2017/051615 A1 | 3/2017 |
| WO | WO 2017/077716 A1 | 5/2017 |
| WO | WO 2017/163934 A1 | 9/2017 |
| WO | WO 2017/201125 A1 | 11/2017 |

* cited by examiner

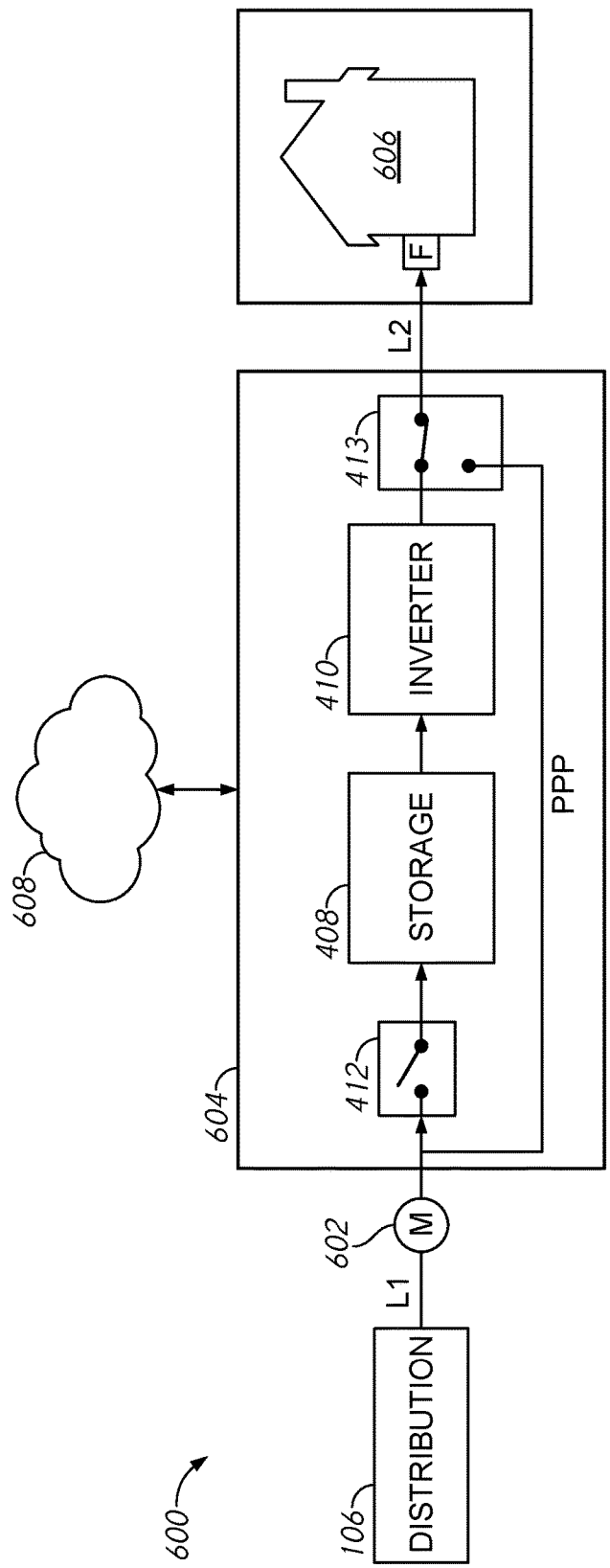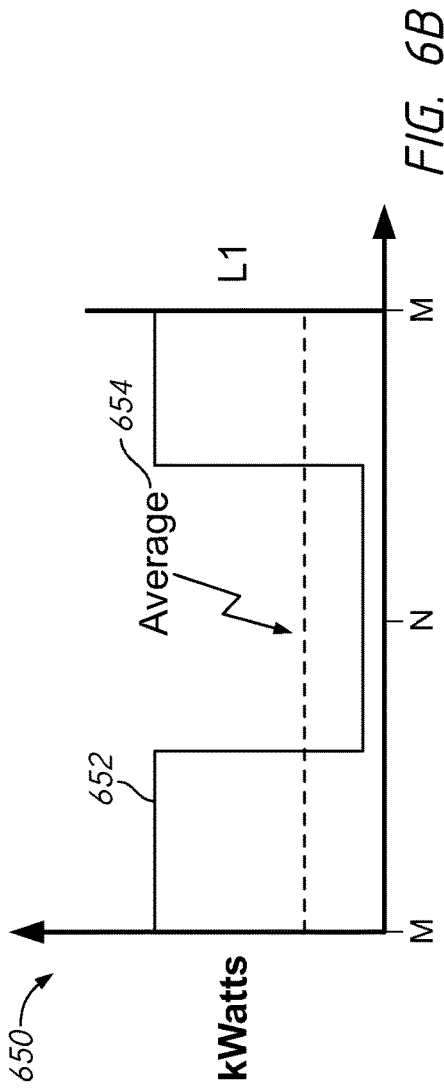
FIG. 6A
FIG. 6B

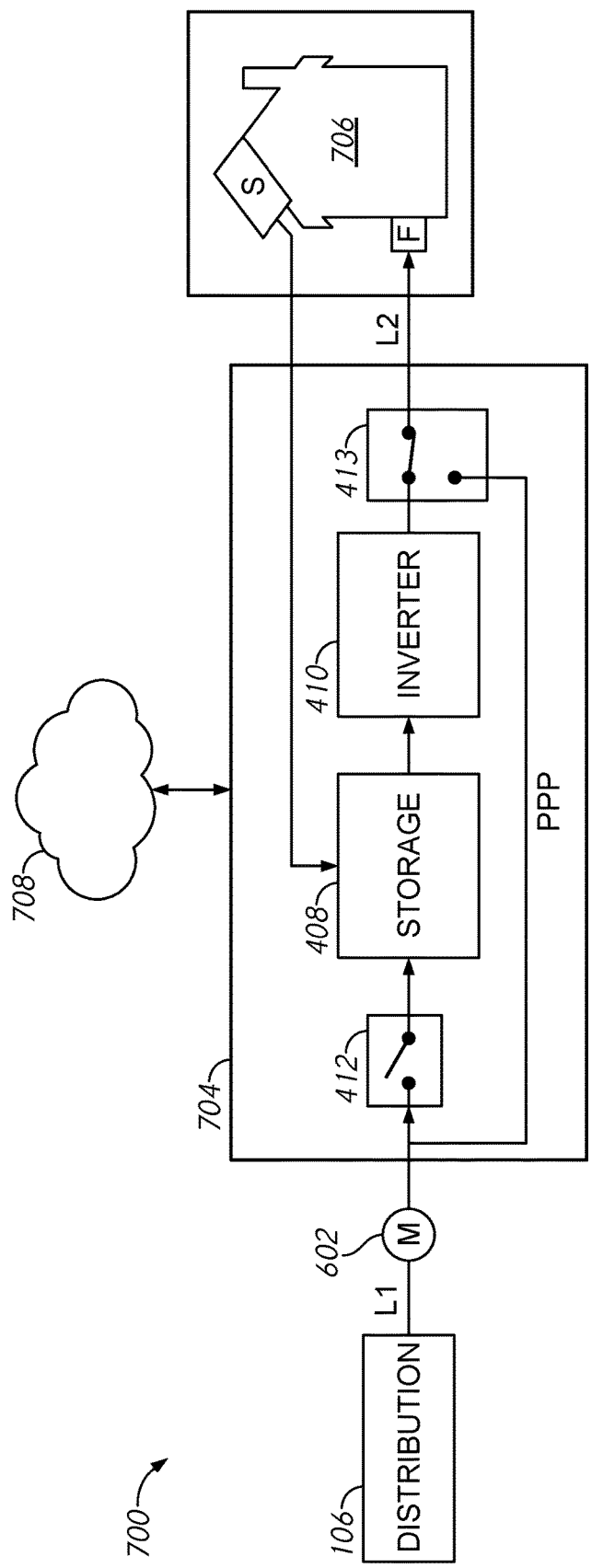
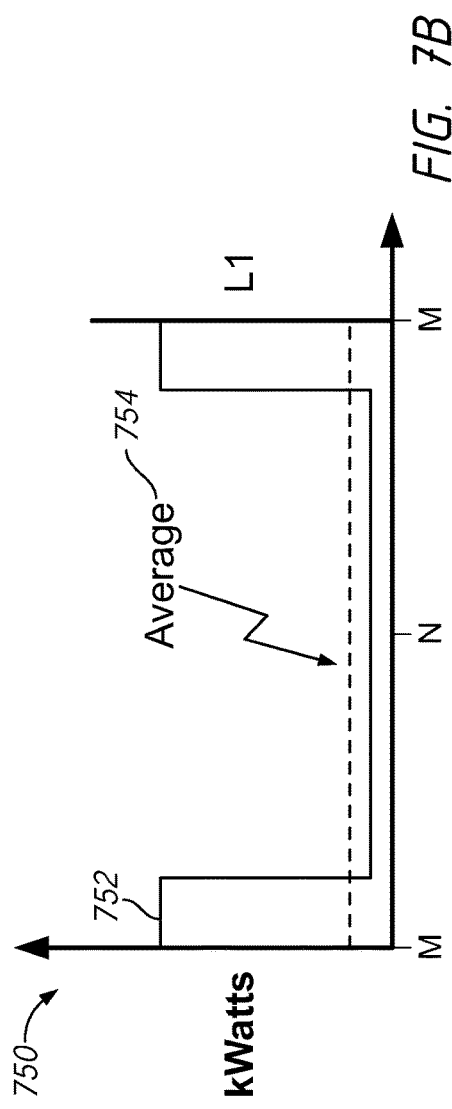
FIG. 7A
FIG. 7B

PERSONAL POWER PLANT SYSTEM AND METHODS OF INVERSE ENERGY GENERATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Electricity distribution companies (utilities) are becoming increasingly challenged to maintain a reliable electricity supply. Historically, electricity has been generated with large, megawatt level power plants. FIG. 1 illustrates an electric grid including a centralized electrical power generation subsystem 100 including a large-scale power generation system 102, a transmission system 104, and a distribution system 106. The large-scale power generation system may use hydro, fossil fuel, and nuclear energy to generate the electrical energy. The large-scale generation system 102, as is typical, delivers three phase power to the transmission system 104. The transmission system 104 consists of thousands of miles of three-phase transmission lines connected to the distribution system 106, which includes a network of thousands of distribution points delivering electrical power to industrial, commercial, and residential loads. The electrical grid 100 comprises a large number of large scale power generation systems 102, connected by the transmission system 104, delivering electricity to many consumers.

Generation and deployment of power is managed by Independent System Operators (ISOs). ISOs are tasked with ensuring that sufficient capacity is available to meet the minute-to-minute daily demand and that this energy is provided at lowest cost. To ensure supply reliability, enough 'spinning reserve' from gas-fired peaker plants is kept on tap to satisfy peak demand and, to recover from any large generator outage, at considerable cost.

Distributed storage and generation of renewable energy are the primary technologies currently being touted to ensure a safe and reliable supply of electrical energy for the future. Large-scale solar arrays and wind farms provide distributed electrical power generation. Roof-top solar arrays generate electrical power at thousands of residential and commercial locations.

Wind and solar, however, do not consistently generate electrical energy. Solar energy generation may peak at noon and provide no power at night. Distribution companies are being entrusted with the daunting task of integrating renewables into the electrical power system 100. The integration of renewables, the requirement to provide net-metering, and the solution to problems associated with supplying a diverse load has become increasingly challenging.

SUMMARY

The innovations described in the claims each have several aspects, no single one of which is solely responsible for the desirable attributes. Without limiting the scope of the claims, some prominent features of this disclosure will now be briefly described.

One aspect of this disclosure is directed to a Personal Power Plant (PPP) that locates storage and generation at the load site, supports real time or near real time load balancing, can eliminate net-metering, and can provide for integration of renewable energy generation. In some aspects, the PPP interoperates in the Internet of Things.

Another aspect of this disclosure is directed to "inverse power generation" accomplished by aggregated PPP management software. In some embodiments, a utility can analyze aggregate capacity of connected PPPs when times of peak demand are anticipated. In some modes of operation, selected PPPs do not draw power from the grid during the anticipated peak demand time and thus provide, in aggregation, reduced grid load, or "inverse power generation".

Aspects of the disclosure are directed to a method of using energy storage capacity of independent personal power plants connected to a power distribution network to reduce demand for electrical utility-supplied electrical energy during a predicted period of insufficient electrical utility capacity and thereby avoid the need for additional electrical utility capacity to be brought online during the predicted period of insufficient electrical utility capacity. The method comprises predicting, with each personal power plant of a plurality of personal power plants connected to a power distribution network, energy usage of an associated residence for a next 24-hour period; determining, with each personal power plant, an associated charging schedule that is based at least in part on the associated predicted energy usage, for each personal power plant, for charging an associated battery storage configured to receive electrical energy from an electrical grid according to the associated charging profile; determining, with an electrical utility, that a predicted demand for grid-supplied electrical energy will exceed the then-available grid-supplied electrical energy for a period of time from a starting time to an ending time, within the next 24-hour period; determining an energy deficit magnitude resulting from a magnitude of predicted demand for grid-supplied electrical energy will exceed the then-available grid-supplied electrical energy;

determining for each personal power plant, a magnitude of excess capacity, where the excess capacity is a predicted charged capacity of the associated battery storage at the starting time less the associated predicted energy usage of the associated residence from the starting time to the ending time; identifying a sub-group of the personal power plants that have excess capacity sufficient to power the associated residence from the starting time to the ending time; identifying a portion of the sub-group of personal power plants that together have an aggregate magnitude of excess capacity equal to or greater than the energy deficit magnitude; sending, from the electrical utility, a grid-disconnect command over a network to each personal power plant of portion of the sub-group of personal power plants, a grid-disconnect command instructing each personal power plant of the portion of the sub-group of personal power plants to disconnect the associated battery storage from the electrical grid to thereby prevent the associated battery storage from receiving electrical energy from the electrical grid during the period of time; in response to receiving the grid-disconnect command, each personal power plant of the portion of the sub-group of personal power plants, disconnecting the associated battery storage from the electrical grid to thereby prevent the associated battery storage from receiving electrical energy from the electrical grid during the period of time, and providing electrical energy to the associated residence from the associated battery storage during the period of time; and after expiration of the period of time, reconnecting the associated battery storage of each personal power plant of the portion of the sub-group of personal power plants, to the electrical grid to receive electrical energy from the electrical grid.

In an embodiment, the network is the Internet. In another embodiment, each of the personal power plants includes a charging circuit, at least one battery, an inverter, a transfer switch, and one or more hardware processors.

Aspects of the disclosure are directed to a method of using energy storage capacity of independent personal power plants. The method comprises predicting, with each personal power plant of a plurality of personal power plants connected to a power distribution network, energy usage of an associated residence for a next time period; determining, with each personal power plant, an excess capacity magnitude, the excess capacity magnitude being a predicted charged capacity of an associated battery storage at a starting time less the associated predicted energy usage of the associated residence from the starting time to an ending time within the next time period; receiving, at each personal power plant of a sub-group of personal power plants that have the excess capacity sufficient to power the associated residence from the starting time to the ending time, a grid-disconnect command over a network when a predicted demand for grid-supplied electrical energy exceeds available grid-supplied electrical energy from the starting time to the ending time; in response to receiving the command, disconnecting, with each personal power plant of the sub-group of personal power plants, an associated battery storage from the electrical grid to thereby provide electrical energy to the associated residence from the associated battery storage from the starting time to the ending time; and after the ending time, reconnecting, with each personal power plant of the sub-group of personal power plants, the associated battery storage to the electrical grid.

In an embodiment, the method further comprises determining an energy deficit magnitude resulting from the magnitude of predicted demand for grid-supplied electrical energy will exceed the then-available grid-supplied electrical energy from the starting time to the ending time. In another embodiment, the method further comprises determining that the sub-group of personal power plants that together have an aggregate magnitude of excess capacity equal to or greater than the energy deficit magnitude. In an embodiment, an electrical utility determines that the predicted demand for grid-supplied electrical energy will exceed the available grid-supplied electrical energy from the starting time to the ending time.

In an embodiment, the method further comprises identifying the sub-group of the personal power plants that have the excess capacity sufficient to power the associated residence from the starting time to the ending time. In another embodiment, an electrical utility sends the grid-disconnect command to each personal power plant of the sub-group of personal power plants. In an embodiment, disconnecting the associated battery storage from the electrical grid prevents the associated battery storage from receiving electrical energy from the electrical grid. In another embodiment, reconnecting the associated battery storage to the electrical grid permits the associated battery storage to receive electrical energy from the electrical grid. In an embodiment, the method further comprises determining, with each personal power plant, an associated charging schedule for the associated battery storage that is based at least in part on the associated predicted energy usage. In another embodiment, reconnecting the associated battery storage to the electrical grid comprises charging the associated battery storage from the electrical grid according to the associated charging schedule.

Aspects of the disclosure are directed to a method of using energy storage capacity of independent personal power plants. The method comprises predicting, with each personal power plant of a plurality of personal power plants connected to a power distribution network, energy usage of an associated residence for a next time period; receiving, at each personal power plant of a sub-group of personal power plants, a grid-disconnect command in response to a determination that a predicted demand for grid-supplied electrical energy from an electrical grid will exceed available grid-supplied electrical energy from the electrical grid for at least a portion of the next time period; in response to receiving the command, disconnecting, with each personal power plant of a sub-group of personal power plants, an associated battery storage from the electrical grid during the at least a portion of the next time period; and providing electrical energy to the associated residence from the associated battery storage during the at least a portion of the next time period.

In an embodiment, the method further comprises determining, with each personal power plant, a magnitude of excess capacity. In another embodiment, the excess capacity is a predicted charged capacity of the associated battery storage at a starting time less the associated predicted energy usage of the associated residence from the starting time to an ending time of the at least a portion of the next time period. In another embodiment, a sum of the magnitudes of the excess capacities of the sub-group of personal power plants is at least a magnitude of a difference between the predicted demand for the grid-supplied electrical energy and the available grid-supplied electrical energy for the at least a portion of the next time period. In another embodiment, disconnecting the associated battery storage from the electrical grid prevents the associated battery storage from receiving electrical energy from the electrical grid during the at least a portion of the next time period. In a further embodiment, the personal power plants of the sub-group of personal power plants are identified as having excess capacity to power the associated residence during the at least a portion of the next time period without being connected to the power distribution network. In another embodiment, the method further comprises, after expiration of the at least a portion of the next time period, reconnecting, with each personal power plant of the sub-group of personal power plants, the associated battery storage to the electrical grid to receive electrical energy from the electrical grid.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

These drawings and the associated description herein are provided to illustrate specific embodiments and are not intended to be limiting.

FIG. 6A is a block diagram illustrating a residence having a personal power plant that provides load tailoring and whole house power according to certain embodiments.

FIG. 6B is a graph of the electrical load of a residence having a personal power plant according to certain embodiments.

FIG. 7A is a block diagram illustrating a residence having a personal power plant with alternate electrical energy generation integration according to certain embodiments.

FIG. 7B is a graph of the electrical load of a residence having a personal power plant with alternate electrical energy generation integration according to certain embodiments.

DETAILED DESCRIPTION

Figure 1:
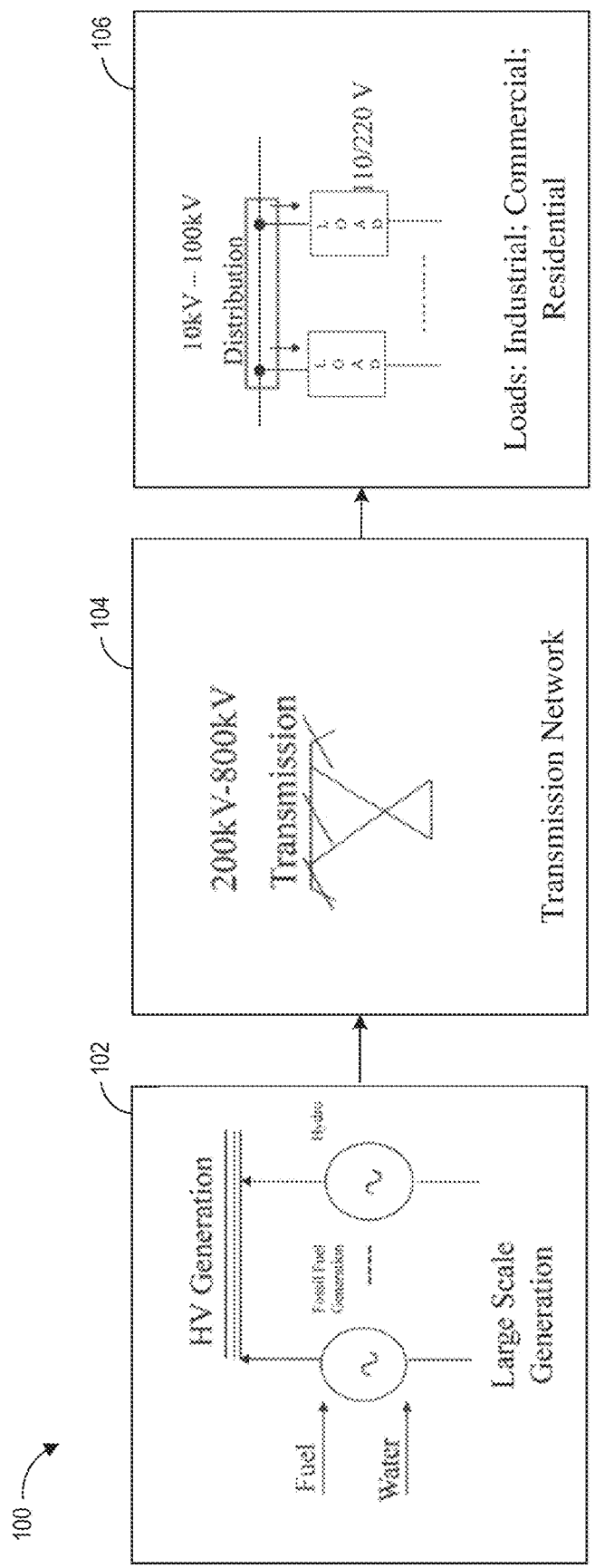
FIG. 1 is a block diagram illustrating a prior art electrical power distribution system according to certain embodiments.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings or software enablement functionalities.

Overview

Distributed storage and generation, which has been defined in a number of ways and implemented and/or supported as "grid enhancement features," can be key to ensuring reliable electrical power delivery. Working in conjunction with the grid or located off-grid, the Personal Power Plant (PPP) can provide on-demand and distributed residential scale AC electricity from stored energy. PPP customer locations can be residential home owners or small commercial locations that consume, for example, between approximately 10 and approximately 48 kilowatt hours (kWh) of electrical energy per day. Unlike grid side distributed storage and generation, which are typically located at substations or at wind and solar farm generation sites, the PPP can be located at the residential or small commercial load site.

The PPP can integrate electrochemical storage batteries with an electronics subsystem to provide on demand power. Batteries store the energy from traditional and non-traditional sources for later use. The energy can be from the energy grid, generated by non-traditional energy sources, such as fuel cells, solar cells, wind turbines, geothermal sources, and the like and/or any device that can produce either AC or DC current/energy. In an embodiment, the batteries typically comprise one or more 24 or 48-volt batteries connected in series.

In an embodiment, the PPP employs power electronics for battery charging and AC generation and runs management software that links operation to the smart grid through the Internet of Things. The PPP includes electronic modules that manage storage and efficiently convert the stored DC energy from the batteries to on-demand residential scale AC electricity. The PPP further includes a system controller to manage battery charging and to monitor and control system operation. The system controller also provides cloud access and communication to manage battery charging. For example, the system controller accesses and manages system current, voltage, and wattage measurements and provides a variable-time record that is used locally and may be viewed via the cloud.

In one aspect, the storage capacity of the batteries, measured in kWh, can be approximately the same as average daily load. This storage capacity can be increased or decreased. Higher storage capacity can support higher performance, e.g. blackout protection, off grid operation, etc., while lower capacity can reduce system cost and reduce power output duration time in the event that all energy sources are 'interrupted'. In California, average daily residential electricity consumption can be approximately 24-32 kWh. In an embodiment, the storage capacity of the batteries for cost-performance can be in the approximately 24-32 kWh range.

In one aspect, the storage capacity of the batteries can be sufficient to store at least enough energy to generate on-demand residential power for approximately the next 24 hours and the system controller can control battery charging to ensure that there is sufficient energy stored in the batteries to generate the on-demand power for approximately the next 24 hours, even if all energy sources are lost, such as occurs during storms or fires.

Aspects of the PPP can provide alternative power source integration, such as for solar, wind, etc. Unlike grid tied solar that employs net metering, approximately all power generated by the PPP is used by the load. Energy from the grid or other energy sources is stored on an as-needed basis and at a rate determined by the system computer. Energy from the grid or other energy sources can be used to 'top up' the battery storage. To manage variability, unpredictability and intermittency of solar, the system controller, interoperating with the Internet, projects the expected next 24-hours of solar insolation and from this, can determine how much solar energy will be stored and available and can predict how much managed energy from the electrical grid, if any, will need to be added to storage to ensure continuous operation. The management software in the system controller can determine how much additional managed energy to add based on projected demand. For example, if the projected insolation for 4 kW of solar photo voltaic (PV) operating for a period of 6-8 hours over the next 24 hours produces 24 kWh of energy and the projected demand is 26 kWh, then the system will add 2 kWh of (grid) energy over the next 24 hours or 48 kWatts for 24 hours to ensure continuous operation.

In other aspects, the PPP can provide a transactional benefit by providing demand response/grid management (i.e., load shedding, load leveling, peak shaving, etc.) The PPP can be remotely programmed and commanded to draw specified amounts of grid energy. An aspect of at least some of the innovations disclosed herein includes the realization that such PPPs can also be used to increase or decrease grid demand in response to requests from the energy distributor, such as an electrical utility. This capability can be independent of the load site demand at each location.

To provide sufficient generation capacity in times of rapidly increasing demand, utilities need to be able to rapidly add and reduce generation. A source for this generation is typically gas turbines. To minimize the detrimental effects on the grid from large scale solar and wind farm generation, utilities may install costly large megawatt storage at these sites. While this is financially attractive to investors and storage vendors, generation and grid distribution losses can be high and it may be necessary to 'throw away' energy when storage is full and demand is nil.

To obtain medium to large scale grid stabilization benefits, PPP's can be aggregated to provide a reliable demand response on the scale of megawatts. This benefit is not available from standard grid tied solar. Whereas grid tied solar load introduces intermittency, a solar-fueled PPP eliminates intermittency. PPP owners can participate in transactional benefits as well as eliminating grid problems caused by net metering. The PPP provides a superior distributed storage solution because it can provide 'inverse demand' changes or "inverse generation" over a very short time scale. For example, 20,000 PPP's operating in an aggregated mode and each continuously storing from 500 watts to 1,000 watts can be commanded to stop charging. This in effect produces the same effect as increasing available grid generation— bringing it on line 'instantaneously'—to a level of from 10 to 20 megawatts.

The residential electricity market in the United States is approximately 100 million homes. Residential electricity use amounts to over 35% of the total electricity market. The remainder is made up of commercial and industrial demand. Distributed generation using the PPP has the potential to replace up to 50% of all grid generated electricity while decreasing distribution losses. If the majority of energy used by the PPP is solar and wind, the generation of carbon products is reduced commensurately. The PPP also provides the capability for consumer participation in demand response.

Green home builders, micro grids, and cooperatively owned utilities can all benefit directly from PPP technology. Home owners can benefit financially and directly from the reduction in their electricity bill and the capability to maintain their supply in the event of grid failure. Utilities can benefit by directly utilizing PPP networks for grid management and society can benefit indirectly by the replacement of 40% of all electrical energy generated from fossil fuels by the existing generation stations.

In summary, distributed generation and storage, located at the residential load site has the promise of greatly enhancing electricity supply security and reliability. Because the residential owner provides free (roof) space for mounting PV and for locating storage, and because distribution losses are minimized, the PPP solution is the most cost effective, efficient, green, and secure solution for 24/7 consumer level power delivery.

The PPP according to some embodiments, can be configured to provide one or any combination of the following benefits:
Fixes the cost/price of a residential kilowatt hour;
Removes the effects of intermittent solar/wind from the grid;
Reduces grid capacity requirements;
Reduces grid transmission losses;
Helps stabilize grid load;
Produces carbon free electricity;
Supplies fossil-free fuel;
Reduces/eliminates grid distribution infrastructure;
Improves environmental aesthetics by reducing or eliminating distribution wires and poles;
Reduces/eliminates the need for centralized wind and solar farms to utilize renewable solar and wind; and
Reduces/eliminates the need for remote fossil fuel generation.

Grid Tied Power

Figure 2A:
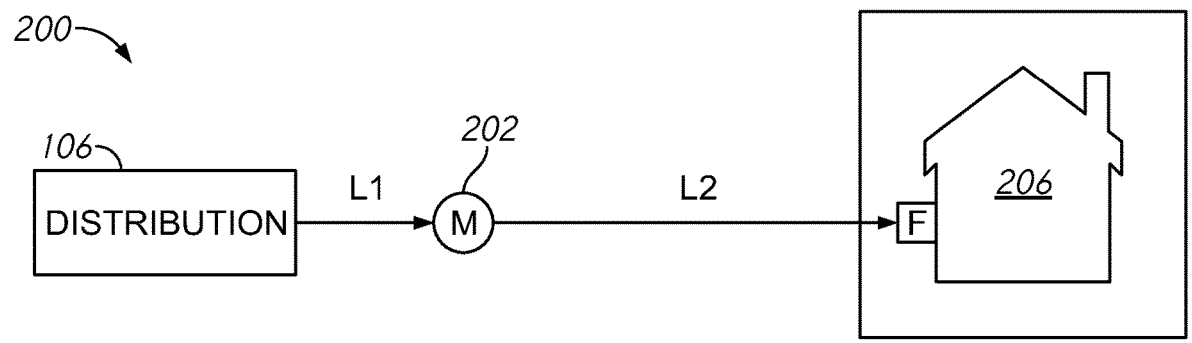
FIG. 2A is a block diagram illustrating a residence receiving electrical energy from the electrical grid according to certain embodiments.

FIG. 2A is a block diagram of a system 200 illustrating a residence 206 receiving electrical energy from the distribution system 106 according to certain embodiments. As described herein, the distribution system 106 refers to the electrical grid and/or the electrical utility. The residence 206 uses electrical energy, represented by load L2. The distribution system 106 provides electrical energy L1 to the residence 206 via an electrical power meter 202 associated with the residence 206. Since all of the electrical energy used by the residence 206 is supplied from the distribution system 106, L1=L2.

Figure 2B:
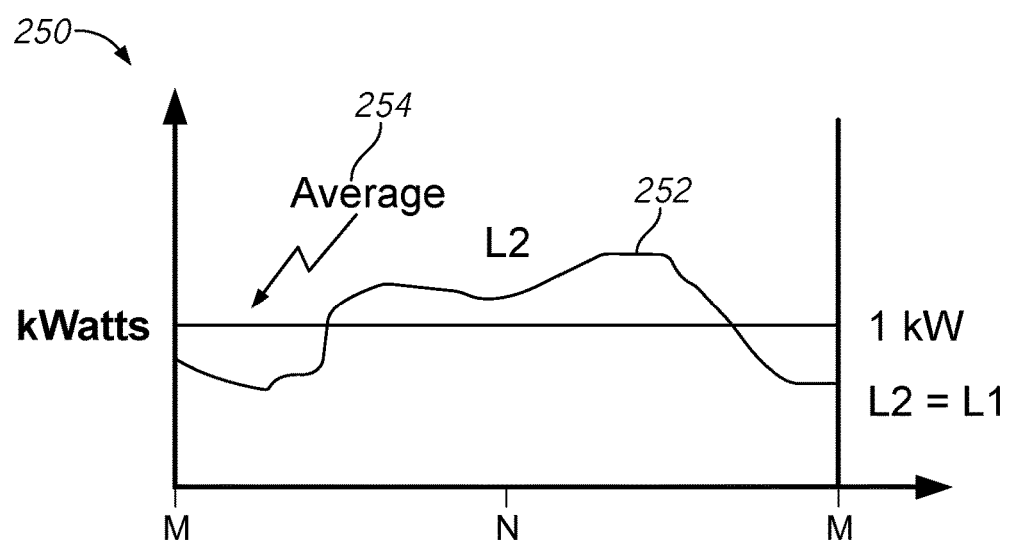
FIG. 2B is a graph of the electrical load of a residence according to certain embodiments.

FIG. 2B is a graph 250 representing the electrical load L2 252 of the residence 206 for a 24-hour period, according to an embodiment. The area under trace 252 represents the energy in kilowatt-hours used by the residence 206 for the 24-hour period. For the residence 206, residential load L2=L1, which is the energy provided by the distribution system 106. The y-axis represents power in kilowatts and the x-axis represents the 24-hour period from midnight (M) to noon (N) and from noon (N) to the next midnight (M). Trace 254 shows the average power used over the 24-hour period. The area under trace 254 represents the average electrical energy in kilowatt-hours used by the residence 206 over the 24-hour period and supplied by the distribution system 106. As indicated by graph 250, energy usage decreases at night when the members of the household are asleep and increases during the day and early evening.

Figure 3A:
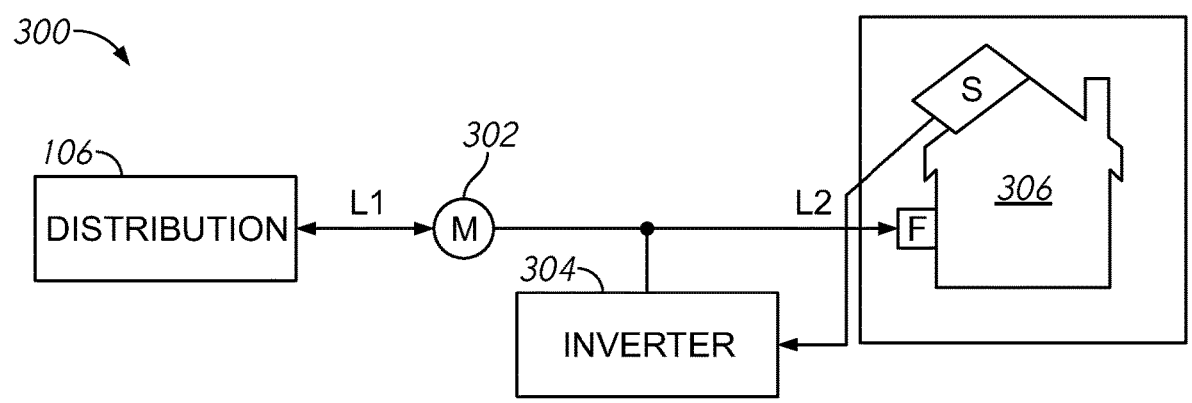
FIG. 3A is a block diagram illustrating a residence having roof top solar with a grid tie interface according to certain embodiments.

More and more residences are adding residential solar generation to generate electrical energy. FIG. 3A is a block diagram of a system 300 illustrating a residence 306 having roof top solar generation S with a grid tie interface according to certain embodiments. The residence 306 uses electrical energy, represented by load L2. The distribution system 106 provides electrical energy L1 to the residence 306 via an electrical power meter 302 associated with the residence 306. The residence 306 provides solar generated DC electrical power to an inverter 304 for conversion to AC electrical power. The inverter 304 is tied to the electrical grid and can supply the solar generated power to the residence 306 or back to the distribution system 106 through the electrical power meter 302. This is an example of net-metering.

Figure 3B:
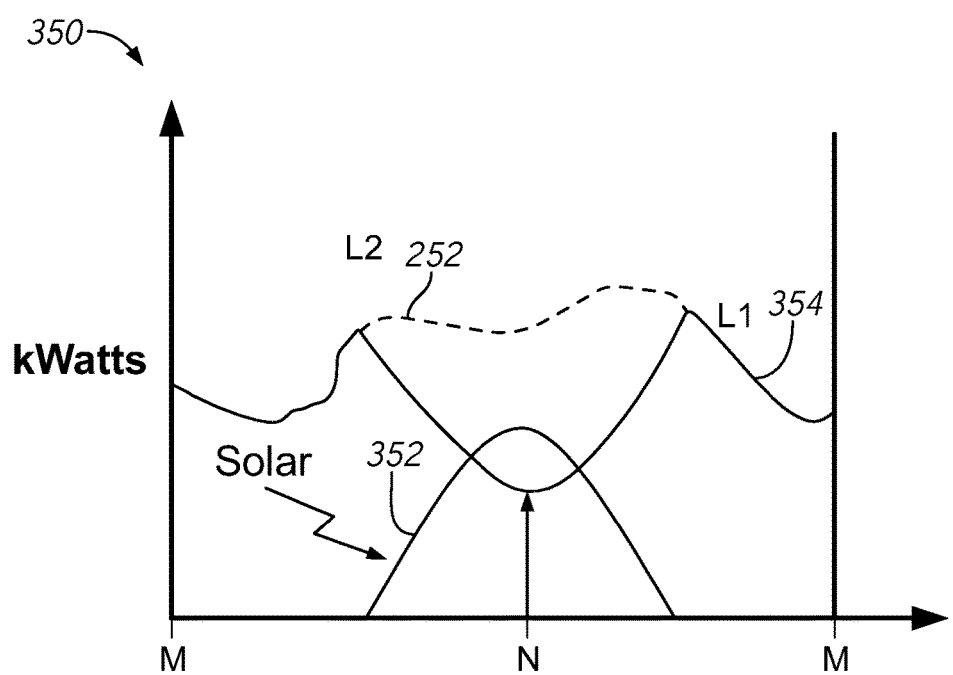
FIG. 3B is a graph of the electrical load of a residence having a grid tied alternate electrical energy source

FIG. 3B is a graph 350 representing the electrical loads for a 24-hour period of the residence 306 having a grid tied alternate electrical energy source, such as the solar generation illustrated in FIG. 3A. Trace 352 illustrates the power generated by the solar panels, which produce power during the daylight hours. Solar generation typically peaks at noon. The area under the trace 352 represents the energy in kilowatt-hours generated by the solar panels. The power provided by the distribution system 106 is represented by L1 354. The area under the trace 354 represents the energy in kilowatt-hours supplied by the distribution system 106, and is approximately the electrical energy used by the residence 306 (the area under trace 252, reduced by the electrical energy generated by the solar panels (the area under trace 352).

Personal Power Plant (PPP)

Figure 4:
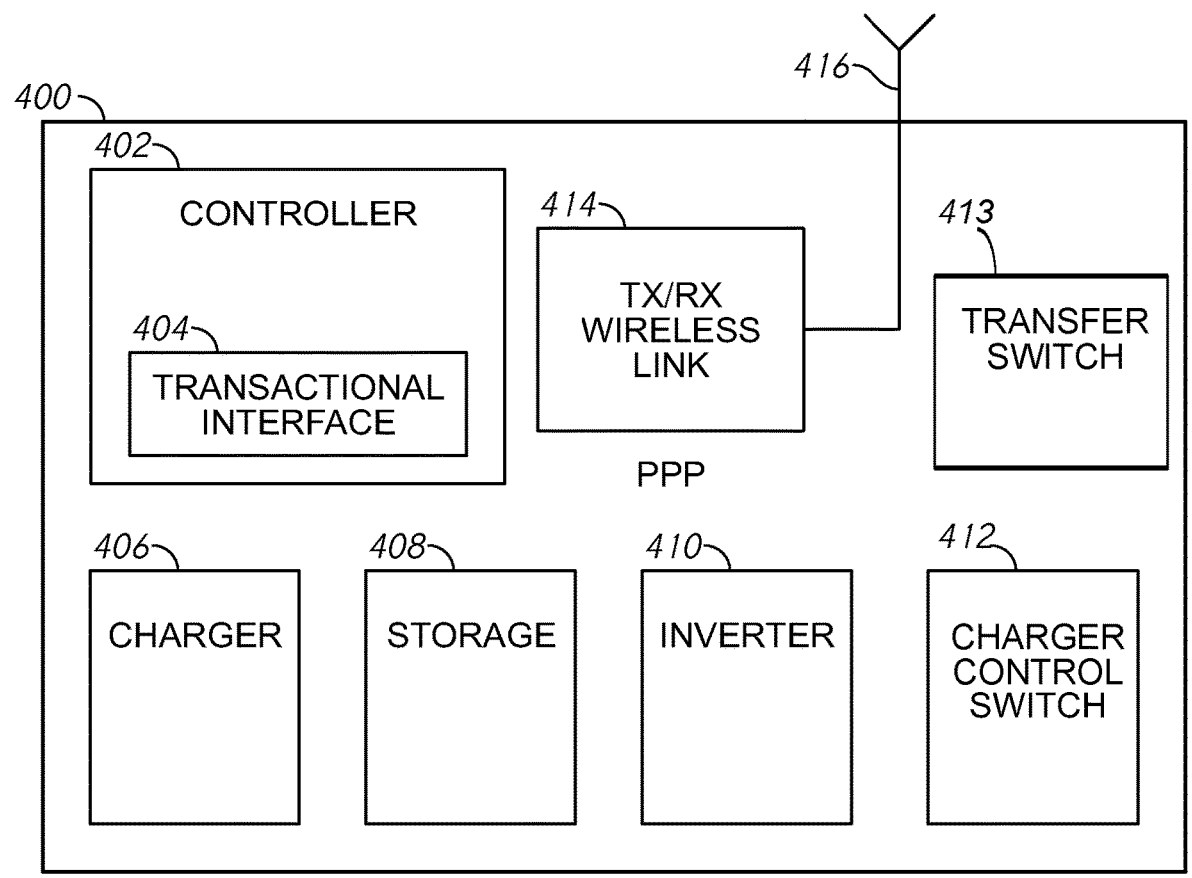
FIG. 4 is a block diagram of a personal power plant according to certain embodiments.

FIG. 4 is a block diagram of a personal power plant (PPP) 400 according to certain embodiments. The illustrated PPP 400 comprises one or more controllers 402 including a transactional interface 404, a transmit/receive (RX/TX) wireless link 414 in communication with an antenna 416, a charger 406, battery storage 408, an inverter 410, a charger control switch 412 and a transfer switch 413.

The battery storage 408 can store electrical energy for use by the residence 306. In an embodiment, the battery storage 408 stores at least enough electrical energy to supply the residence 306 with electricity for a 24-hour period. In certain embodiments, the battery storage 408 comprises electrochemical storage batteries. In some embodiments, the electrochemical storage batteries comprise one or more 48-volt batteries connected in series.

The charger 406 can charge the battery storage 408 using electrical energy provided by the distribution system 106 and/or using electrical energy generated locally at the residence from, for example, but not limited to gas generator, microgrid, wind turbines, solar arrays, and fuel cells.

The inverter 410 can convert the stored energy from the battery storage 408 into AC electrical energy for use by the residence.

The TX/RX wireless link 414 and the antenna 416 can transmit and receive messages via a network, such as the Internet. In some embodiments, the TX/RX wireless link 414 and the antenna 416 can be replaced with a digital network communication device configured for internet access over land lines.

The transfer switch 413 is configured to transfer the residential load to the distribution system 106 in the event the PPP 400 fails. For example, the transfer switch can be represented as a single pole double throw switch or relay located between the output of the inverter 410 and the residential load. In the normally closed position, the transfer switch 413 permits the output of the inverter 410 to electrically connect with the residential load to supply electrical energy from the PPP 400 to the residential load. When the transfer switch is opened, the PPP 400 is electrically disconnected from the residential load and the residential load is electrically connected or "transferred" to the distribution system 106 such that the electrical grid provides the electrical energy to the residential load.

The charger control switch 412 is configured to disconnect and reconnect the PPP 400 from the distribution system 106. For example, the charger control switch 412 can be configured to disconnect the PPP 400 from the distribution system 106 such that the PPP 400 supplies electrical power to the residence, from the storage 408, for any period of time, for example, for a 24-hour period without receiving electrical power from the distribution system 106. In other words, the residence can "island" when the charger control switch 412 disconnects the PPP 400 from the electrical grid 100.

The controller 402 can comprise computer hardware and communicates with the TX/RX wireless link 414 to send data and status and receive commands via antenna 416. The controller 402 can control the charger control switch 412. In an embodiment, the controller 402 controls the charger control switch 412 based at least in part on commands received from the distribution system 106. Further, the controller 402 controls the charger 406 and the inverter 410. The controller 406 can receive status information from the battery storage 408, such as the status of the charged capacity and temperature of the batteries.

In some embodiments, the transactional interface 404 can be configured to determine the least expensive times of day to charge the battery storage 408 from the distribution system 106. For example, the controller 402 can request and receive via the TX/RX wireless link 414 the rate schedule from the distribution system 106. A time of use (TOU) rate schedule may define different electric rates for different time periods. For example, on-peak time periods having on-peak rates may be 1:00 PM to 5:00 PM summer weekdays, except holidays; mid-peak time periods having mid-peak rates may be 8:00 AM to 1:00 PM and 5:00 PM to 10:00 PM for summer weekdays and 7:00 AM to 9:00 PM for winter weekdays, except holidays; and off-peak time periods having off-peak rates may be all other hours. The on-peak rates are higher than the mid-peak and off-peak rates, and the mid-peak rates are higher than the off-peak rates. Using the TOU rate schedule, the transactional interface 404 can be configured by the controller 402 to determine when to charge the battery storage 408 to incur the least expensive electric rates, such as for example, during the off-peak time periods. Further, the transactional interface 404 can accept or decline incentives from the distribution system 106 to island the residence during period of heavy power usage on the electrical grid 100. Some utilities have developed transactional software to predict generation requirements based on the current demand. The utilities typically respond by adding or reducing generation. In this case, the PPP transactional interface 404 can provide "equivalent functionality" when coupled to the utility generation management system maintained and used by the distribution company. This transactional or information exchange enables a utility during a peak demand period to redirect power it normally generates to other users, and not to participating PPPs, rather than obtaining the energy from other sources, such as back-up generators or energy exchanges. The transactional relationship as to the PPPs is based on the information on use and need in their respective controllers, which is relevant for communicating with the utility when it has a need for excess power to meet a spike in demand.

Figure 5:
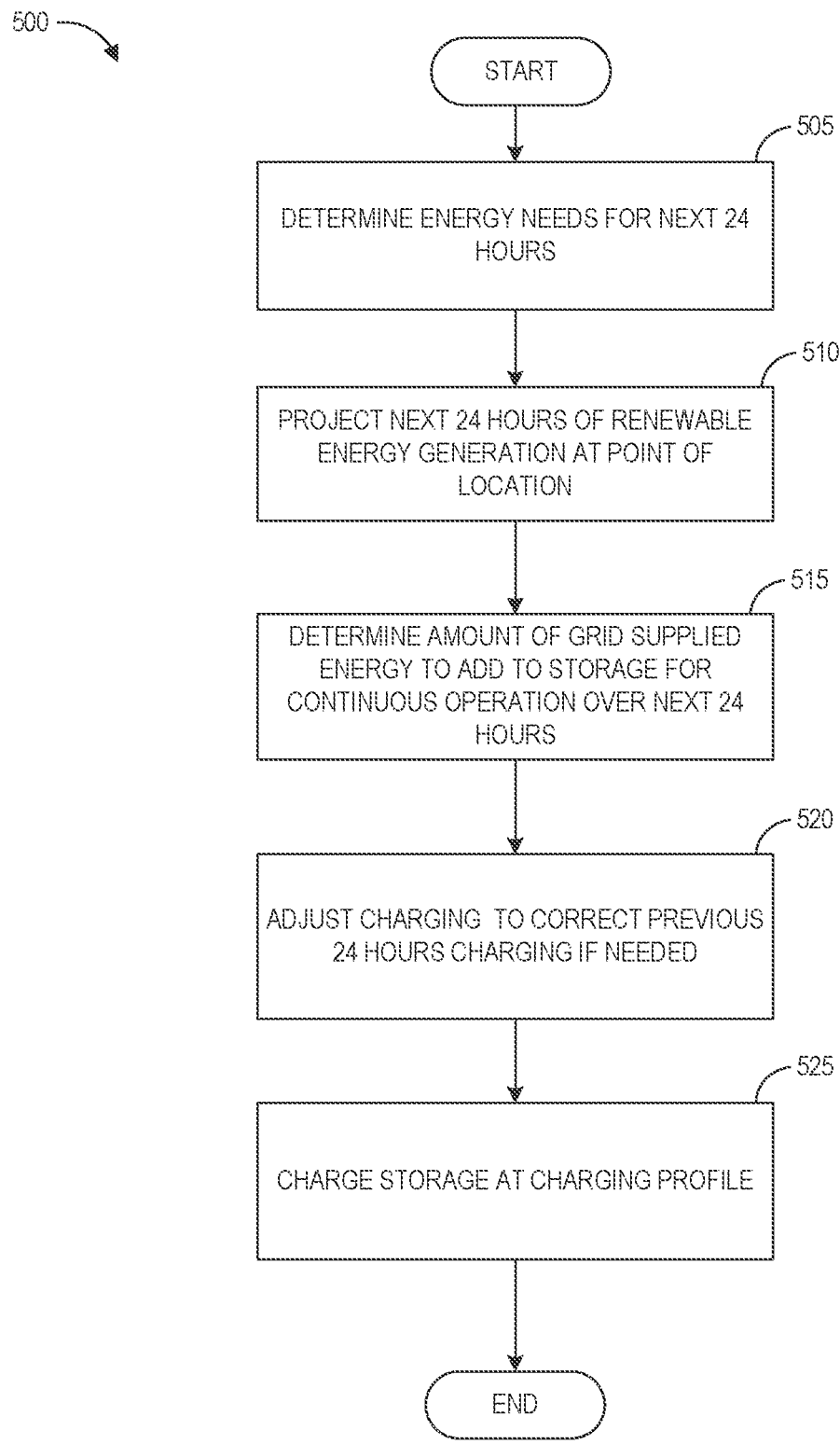
FIG. 5 is a flow chart illustrating a process to supply electrical energy to a single family residence with the personal power plant according to certain embodiments.

FIG. 5 is a flow chart illustrating a process 500 to supply electrical energy to a single family residence with the personal power plant 400 according to certain embodiments. In an embodiment, the process 500 can be implemented to support least cost for the location and/or it can be employed to provide optimal 'inverse generation' for the distribution system. If the distribution company provides a financial incentive to take power at a constant rate and fixes this cost at a lowest value, then the PPP can be programmed to take energy at a profiled level to optimize the distribution load. This can have the effect of 'automatically' eliminating peaks in the distribution system load.

At block 505, the controller 402 can determine the energy needs of the residence for a next 24-hour period. In an embodiment, the controller 402 can determine the future energy needs based at least in part on past or historical energy needs of the residence. For example, the controller 402 can store the past energy usage for periods of time, such as for past 24-hour periods of time. The controller 402 can categorize the past energy usage as weekday, weekend, and holiday days. Referring to FIG. 2B, trace 252 represents the projected or measured electrical load L2 of the residence 206 for a 24-hour period. If the 24-hour period represented is on weekend, the electrical load L2 252 may be lower during a weekday, when family members are not at home during the day time but home in the evening. A holiday may have an even lower electrical load L2 252 when family members are traveling, and the residence is empty. In an embodiment, the controller 402 can determine the energy needs based at least in part on past or historical energy needs of the residence and the current and predicted temperatures at the point of location of the residence. For example, the controller 402 can access a local weather report to determine the current and predicted temperatures, for example. In an embodiment, the controller 402 can use determine whether the predicted energy needs are for a weekend, weekday, or holiday period of time and average a predetermined number of past periods of time within the same category. For example, if the predicted period of time is a Monday, the controller 402 can average the consumed electrical energy for the past 5 non-holiday Mondays. In an embodiment, the controller 402 can use the highest past energy usage for a 24-hour period for the residence as the predicted energy usage for the next-24 hour period. For example, the controller can determine the highest past energy usage for a Monday, and use that stored value as the predicted energy usage for the next Monday 24-hour period. In another example, For example, the controller can determine the highest past energy usage for a Monday that had the same temperature as the predicted temperature, and use that stored value as the predicted energy usage for the next Monday 24-hour period. In some embodiments, the determined energy needs of the residence for the next 24-hour period can be considered as an approximation or an estimation.

At block 510, the controller 402 can project the next 24-hours of renewable energy generation at the point of location. For example, the controller 402 can access a local weather report to determine the level of insolation and wind speed, for example.

At block 515, the controller 402 can determine the amount of grid supplied energy to add to the battery storage 408 in order to supply the residence with electricity for continuous operation over the next 24-hour period. The controller 402 can determine a charging profile that takes into account a time of use fee schedule from the electrical utility in order to charge the battery storage 408 with the least expense. The charging profile can be charge the battery sources 408 at a fixed or contoured rate.

For residences with alternative or renewable energy generation, when the estimated amount of renewable energy generation is approximately equal to or greater than the predicted load, no additional electrical energy from the electrical grid is added to the battery storage 408. When the estimated amount of renewable energy generation is less than the predicted load, or for residences without alternative or renewable energy generation, the PPP 400 adds electrical energy from the electrical grid to the battery storage 408 according to the charging schedule. In an embodiment, the distribution system operator can request a charging schedule with a reduction or increase in level as a function of time, thereby enabling load shifting.

In other embodiments, the controller 402 can determine an amount of grid supplied energy to add to the battery storage 408 in order to supply the residence with electricity for continuous operation over the next 24-hour period plus a surplus amount according to the storage capacity of the battery storage 408. For example, the surplus amount can be a predetermined amount serving as a safety factor. The safety factor can account for incorrect weather predictions, additional people visiting the residence, and the like. The surplus amount can be a predetermined percentage, such as 10%, 15% or the like, of the determined amount of grid supplied energy.

At block 520, the controller 402 can make adjustments to the charging profile to correct for any errors in the previous 24-hour period's charging profile. For example, the weather report may have not been accurate, and less sunshine was received by the solar array, which generated less electrical energy than the controller 402 predicted. In that case, the battery storage 408 may have been undercharged during the previous 24-hour period and the controller 402 can compensate for the undercharge by adjusting the current charging profile.

At block 525, the charger 402 can charge the battery storage 408 according to the specified charging profile. The charging is independent of the load drawn from the battery storage 408.

FIG. 6A is a block diagram of a system 600 illustrating a residence 606 having a personal power plant 604 with network connectivity 608 that provides load tailoring and whole house power according to certain embodiments. The residence 606 uses electrical energy, represented by load L2. The distribution system 106 provides electrical power L1 to the PPP 604 via an electrical power meter 602 associated with the residence 606. If the PPP 604 is not islanding, the charger control switch 412 is closed. When the charger control switch 412 is closed, the battery storage 408 receives the electrical energy according to the charging profile, for example, determined in accordance with the method illustrated in FIG. 5, or another method. Inverter 410 converts the DC stored electrical energy to AC electrical energy for use by the residence 606 according to the load L2. When the charger control switch is open, as illustrated in FIG. 6A, the PPP 604 is islanding and is disconnected from the distribution system 106. FIG. 6A further illustrates the transfer switch 413. When the transfer switch 413 is closed or in a first state, the PPP 604 provides the electrical energy to the residential load L2. When the transfer switch 413 is open or in a second state, the output of the inverter disconnects from the residential load L2 and the residential load L2 electrically connects to the distribution system 106. The may advantageously bypass the PPP 604 when the controller 402 detects a failure. In an embodiment, the controller 402 controls the state of one or more of the charger control switch 412 and the transfer switch 413.

FIG. 6B is a graph 650 of the electrical energy delivered by the distribution system 106 to the battery storage 408 having the personal power plant 604 according to certain embodiments. The y-axis represents electrical power in kW and the x-axis represents the 24-hour period from midnight (M) to noon (N) and from noon (N) to the next midnight (M). The area under trace 652 illustrates the electrical energy in kilowatt-hours stored in the battery storage 408 for the 24-hour period according to the charging profile. Trace 654 illustrates the average power supplied by the distribution system 106 for the 24-hour period. The 24-hour average 654 is the same for L1 and L2. The area under trace 654 represents the electrical energy in kilowatt-hours supplied to the residence 606 for the 24-hour period. Because the charging profile can be configured to charge the battery storage 408 during typically low periods of electrical energy usage and usually the lowest rates, such as from midnight to early morning and from late evening to midnight, the electrical energy L1 supplied by the distribution system 106 is reduced during period of typically high energy consumption, such during the daytime. In an aspect, the average energy supplied by the distribution system 106 and stored in the battery storage 408 does not need to be approximately the same as the average demand L2. The storage capacity and the projected demand can modify the resulting total energy stored over the 24-hour period.

FIG. 7A is a block diagram of a system 700 illustrating a residence 706 having a personal power plant 704 with alternate electrical energy generation integration according to certain embodiments. In the illustrated system 700, the alternate electrical energy generation is illustrated as a solar array S on the roof of the residence 706. In other embodiments, the alternative electrical energy generation can be from one or more wind, fuel cells, and the like, in addition to or in lieu of the solar array S.

The residence 706 uses electrical energy, represented by load L2. The distribution system 106 provides electrical energy L1 to the electrical power meter 702, which provides the electrical energy L1 to the PPP 704. If the PPP 704 is not islanding, the charger control switch 412 is closed. When the charger control switch 412 is closed, the battery storage 408 receives the electrical energy according to the charging profile. When the charger control switch is open, the PPP 604 is islanding and is disconnected from the distribution system 106. Further, the battery storage 408 receives the solar generated electrical energy from the solar array S as it is generated. Inverter 410 converts the DC stored electrical energy to AC electrical energy for use by the residence 706 according to the residential load L2. Inverter 410 is not tied to the electrical grid and does not provide electrical energy from the battery storage 408 or from the solar array S back to the distribution system 106. FIG. 7A further illustrates the transfer switch 413, which is described above with respect to FIGS. 4 and 6A.

FIG. 7B is a graph 750 of the electrical power L1 delivered by the distribution system 106 to the battery storage 408. The y-axis represents electrical power in kW and the x-axis represents the 24-hour period from midnight (M) to noon (N) and from noon (N) to the next midnight (M) for the battery storage 408 of the personal power plant 704 with alternate electrical energy generation integration according to certain embodiments. Trace 752 illustrates the electrical power supplied by the distribution system 106 for the 24-hour period according to the charging profile. The area under trace 652 represents the power in kilowatt-hours supplied by the distribution system 106 for the 24-hour period. Trace 754 illustrates the average power supplied by the distribution system 106 for the 24-hour period. The area under trace 754 represents the average electrical energy in kilowatt-hours supplied by the distribution system for the 24-hour period. Because the charging profile can be configured to charge the battery storage 408 during typically low period of electrical energy usage, such as from midnight to early morning and from late evening to midnight, the electrical energy L1 supplied by the distribution system 106 is reduced during period of typically high energy consumption, such during the daytime.

Comparing graph 650 with graph 750, the amount of electrical energy L1 supplied by the distribution system 106 for residence 706 with an alternative energy generation source is less than the amount of electrical energy L1 supplied by the distribution system 106 for residence 606 that is without an alternative energy generation source. Similarly, the average power 754 is less than the average power 654. In an aspect, the 24-hour average energy can be lower but the peak power can be higher depending on the specified charging contour of the charging profile.

Aggregating Personal Power Plants

Figure 8A:
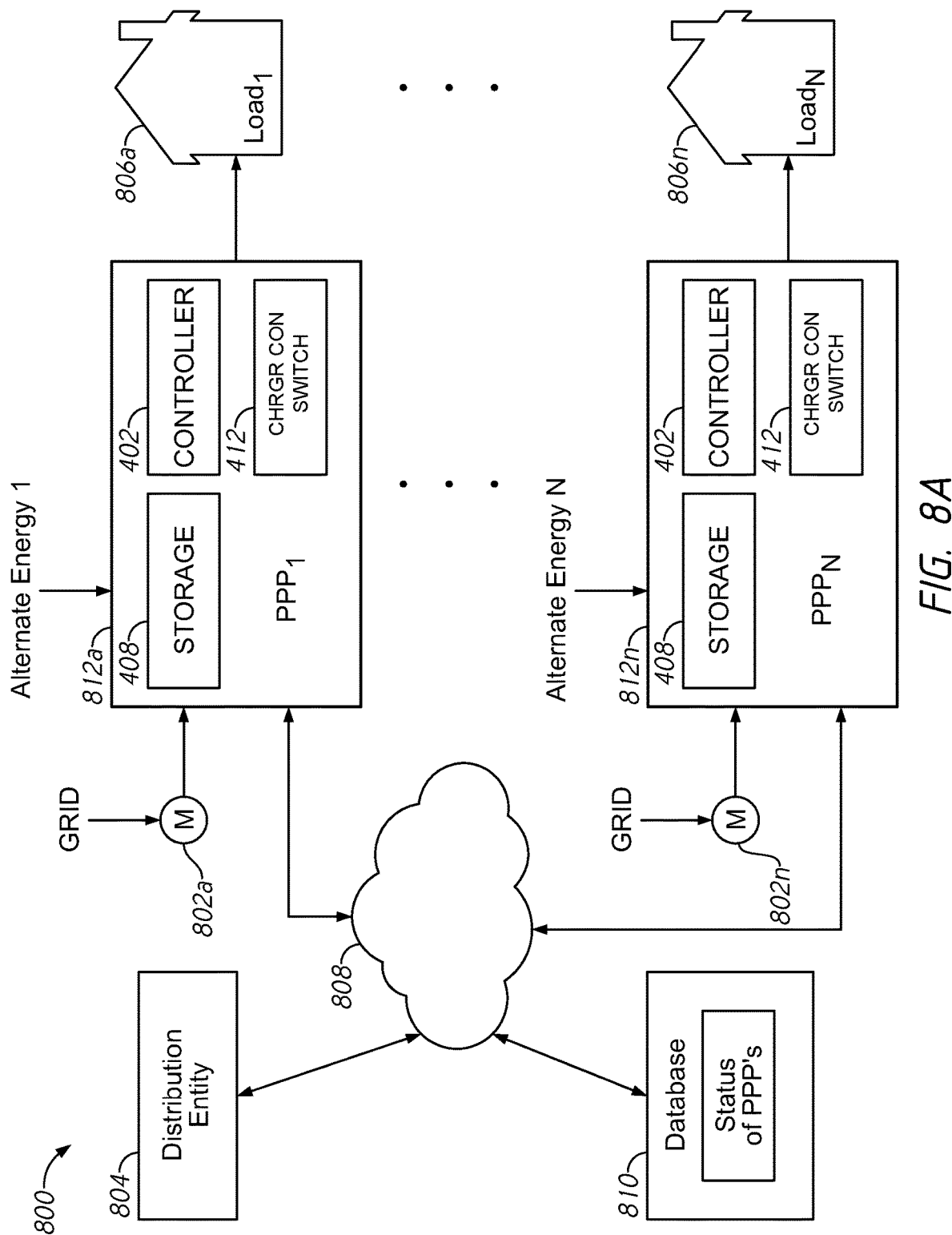
FIG. 8A is a system of residences and associated personal power plants according to an embodiment.

FIG. 8A is a system 800 of residences 806 and associated personal power plants (PPP) 812 according to an embodiment. A plurality of residences 806a-806n can consume electrical power represented by load1-loadN, respectively. As described with respect to FIG. 4, each PPP 812a-812n can comprise at least the one or more controllers 402, the battery storage 408, and the charger control switch 412. Each controller 402 can control the charging of the battery storage 408 according to the charging profile. As described above, the charging profile can be determined by each controller 402 based at least in part on the predicted energy usage of its associated residence 812. Each controller 402 further can island its associated PPP 812 by controlling the state of the charger control switch 412.

Each residence 806a-806n receives electrical power from its PPP 812a-812n, respectively. Each PPP 812a-812n can store electrical energy from its alternate energy generation, Alternate Energy1-Alternate EnergyN, respectively. Alternate Energy1-Alternate EnergyN can be solar generated energy, wind generated energy, fuel cell generated energy, a combination of any of the solar, wind, fuel cell generated energy, and the like. Each residence 812a-812n can have different alternative energy generation.

In addition, each residence 806a-806n is associated with an electrical power meter 802a-802n, respectively, which can supply the PPP 812a-812n, respectively, with specified electrical energy from the electrical energy grid. In the illustrated system 800, the residential load L2 is supplied from the PPP 812 and the PPP 812 can receive electrical energy from the alternative energy generation sources associated with the residence 806 and from the electrical energy grid.

A distribution entity 804, such as the electrical utility, and the controllers 402 of the plurality of PPPs 812a-812n communicate via a network 808, such as the Internet. Database 810 can include the status of the PPPs 812a-812n. The status information can include, for example, but not limited to, the amount of storage capacity of each PPP 812, the amount of remaining energy stored in each battery storage 408 of each PPP 812, whether each PPP 812 is islanded or maintains a connection to the electrical power grid via the electrical power meter 802, contact information for the owners and/or residents of the residences 806, current storage capacity of the battery storage 408, battery temperature, system temperature, PPP identifier, service date-reference, daily load history, overload(s), load/demand level for the next 24-hour period by the PPP 812, actual demand response request, time amount of power, battery status, and the like. Database 810 can be stored within the network 808 or at the distribution entity 804.

In an embodiment, each PPP 812 stores in the database 810 an indication of an amount of excess energy for the next 24-hour period. In an aspect, if the PPP 812 projects that there will be more energy from solar/wind/other than used by the projected load, the projected distribution use can be flagged as zero and the residence 806 can be alerted that there is power available for 'controllable operation devices, such as washing machines, increased air conditioning, and the like. The excess energy can be the total amount of energy stored or to be stored in the battery storage 408 for the next 24-hour period less the predicted amount of energy to be consumed for the next 24-hour period. The distribution entity 804 can predict an amount of electrical power needed for the next 24-hour period. Then the distribution entity 804 can access the database 810 and determine, in aggregate, whether the amounts of excess energy from the plurality of PPPs 812a-812n can meet at least a portion of the predicted amount of electrical energy to be supplied by the distribution entity for the next 24-hour period. The aggregated number of PPPs 812 can be all or a portion of the plurality of PPPs 812a-812n.

The distribution entity 804 can communicate electronically with the PPP controllers 402 to island the respective PPPs 812 for at least a portion of the next 24-hour period. The distribution entity 804 may offer incentives to the residents to accept the request.

In an embodiment, the distribution entity 804 can send a command to the controllers 402 of the aggregated PPPs 812 to island. In response, the controllers 402 cause the charger control switch 412 of each aggregated PPP 812 to open, such that the PPPs 812 are not connected to the electrical grid. The residences 806 continue to draw power from the battery storage 408. The battery storage 408 does not recharge from the electrical grid during the specified time period.

This has the effect of reducing the power demand on the electrical grid by the amount electrical energy used, in aggregation, by the residences 806 that have islanded. As referred to herein, this can be considered as a system and method of "inverse electrical energy generation". In one aspect, the distribution entity 804 can meet its demand for electrical energy during heavy period of use without, for example, firing up peaker plants, or without causing brown or black outs for its customers.

While each individual PPP 812 contributes a small amount of energy savings, in aggregation, the amount of energy contributed can be large. The aggregation can be one or more neighborhoods, one or more regions, or one or more counties, sufficient to create the extra demand on the distribution entity 804.

Figure 8B:
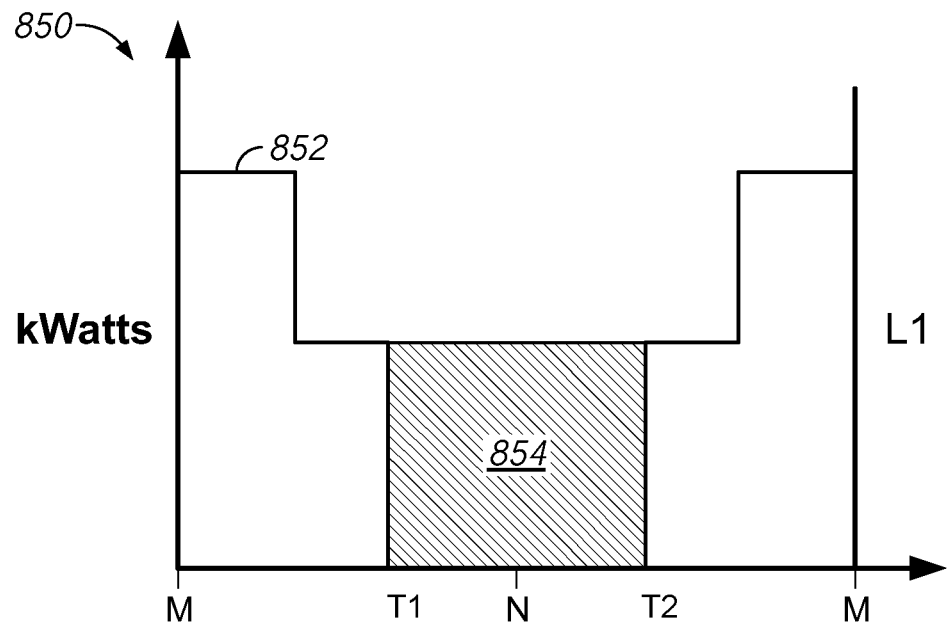
FIG. 8B is a graph of the electrical load of a residence illustrating inverse power generation according to certain embodiments.

FIG. 8B is a graph 850 of the electrical load L1 of the residence 806 illustrating inverse power generation according to certain embodiments. Trace 852 L1 represents an embodiment of a charging profile for power from the electrical grid for the PPP 812 for a 24-hour period. At time T1, the PPP 812 islands and does not draw electrical power from the electrical grid. At time T2, the PPP 812 resumes its charging profile. The area 854 represents an amount of energy not drawn by the battery storage 408 from time T1 to time T2. The area 854 also represents the energy available to the distribution entity 804 created by islanding the PPP 812 from time T1 to time T2. This is a portion of the aggregated inverse power generated by the plurality of aggregated PPP 812.

Figure 8C:
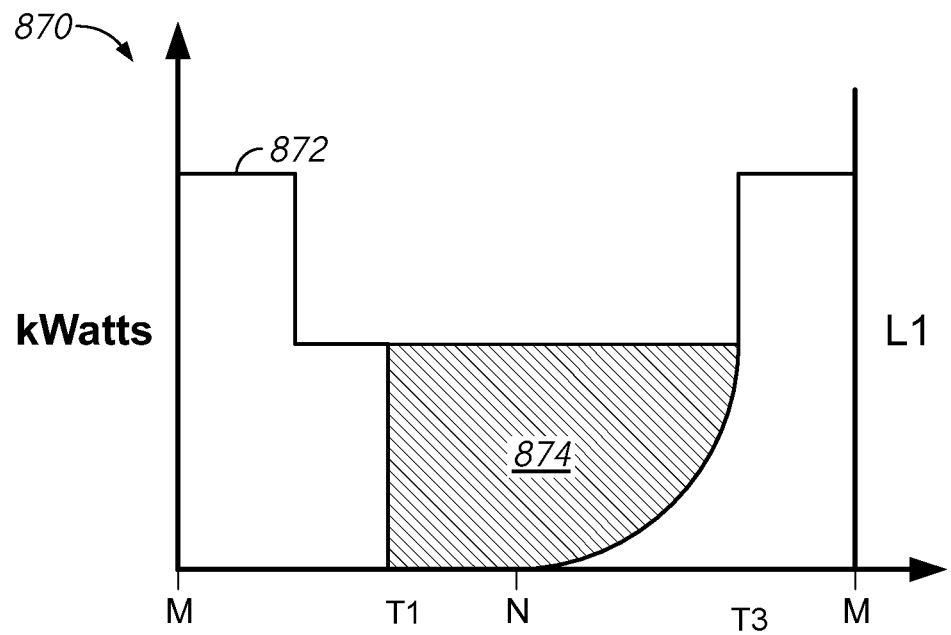
FIG. 8C a graph of the electrical load of a residence illustrating inverse power generation according to certain embodiments.

FIG. 8C a graph 870 of the electrical load of the residence 806 illustrating inverse power generation according to certain embodiments. Similar to FIG. 8B, trace 872 L1 represents an embodiment of a charging profile for power from the electrical grid for the PPP 812 for a 24-hour period. At time T1, the PPP 812 islands and does not draw electrical energy from the electrical grid. FIG. 8C illustrates a gradual resuming of the charging profile and at time T3, the charging profile has resumed to its pre-islanding amount. The area 874 represents the energy available to the distribution entity 804 created by islanding the PPP 812. In an embodiment, the PPP 812 charges, over the next 24-hour period, the battery storage 408 to replenish the energy 874 based at least in part on the battery charge level of the battery storage 408. In an embodiment, the PPP 812 uses the battery charge level to determine how much energy is needed to replenish the battery storage 408, starting at midnight.

Figure 9A:
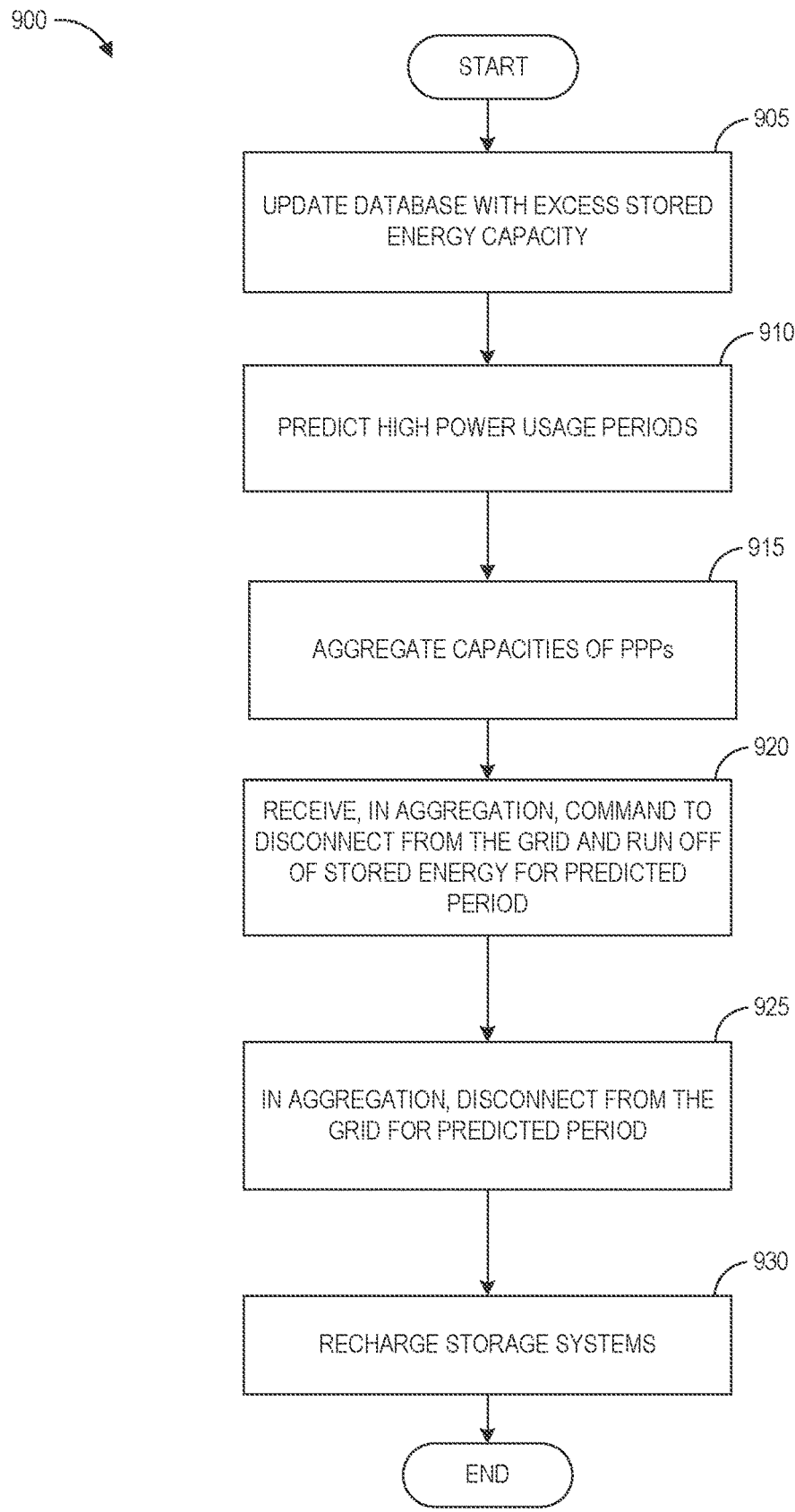
FIG. 9A is a flow chart illustrating an inverse power generation process according to certain embodiments.

FIG. 9A is a flow chart illustrating an inverse power generation process 900 according to certain embodiments. At block 905, each PPP 812 updates the database 810 with an amount of excess energy or excess capacity for the next 24-hour period stored in the battery storage 408. In an embodiment, each PPP 812 further provides a power level and a time period of availability. In an embodiment, the next period may be more than 24 hour or less than 24 hours. In an aspect, the database 810 can be updated one a minute, every 5 minutes, one a day, or the like. In an embodiment, the PPPs 812 synchronize the database update with timing provided by the utility for supporting demand response. In an embodiment, each PPP 812 updates the database 810 with an amount of excess energy or excess capacity for one or more sub-periods within the next 24-hour period. For example, the 24-hour period can comprise a 4 sub-periods of 6 hours each, 24 sub-periods of 1 hour each, 3 sub-periods of 8 hour each, and the like, within the 24-hour period. The next period may be defined by a next period starting time and a next period ending time and the sub-period within the next period may be also defined by a sub-period starting time and a sub-period ending time. In an embodiment, each PPP 812 determines a magnitude of excess capacity, where the excess capacity is the predicted charged capacity of the associated battery storage 408 at the starting time less the predicted energy usage of the associated residence 606, 706, 806 from the starting time to the ending time. In another embodiment, the distribution entity 804, based on the information in the database 810, determines the magnitude of excess capacity of each PPP 812.

At block 910, the distribution entity 804 predicts the amount of electrical energy needed as a prediction of the power used as a function of time, such as for the next 24-hour period and/or for one or more of the sub-periods. The distribution entity 804 determines additional electrical energy, if any needed to meet the predicted electrical energy needs for the next 24-hour period. Generation in excess of the load is set aside to handle losses and to cover possible generator outages. For example, the distribution entity 804 subtracts its generation capacity from the predicted amount of electrical energy needed for the next 24-hour period and/or one or more sub-periods to determine the additional electrical energy needed. In an embodiment, the distribution entity 804 determines that the predicted demand for grid-supplied electrical energy will exceed the then-available grid-supplied electrical energy for a period of time from a starting time to an ending time within the next period of time. The distribution entity 804 can then determine an energy deficit magnitude that results from the magnitude of the predicted demand for grid supplied electrical energy exceeding the then-available grid-supplied electrical energy. The energy deficit magnitude can reflect the total amount of energy (e.g., kilowatt hours) as well as the over-capacity load, e.g., the magnitude of kilowatts above that which the grid can supply at any and all times from the starting time to the ending time. If the amount of predicted electrical energy for all or a portion of the next-24 hour period exceeds a predetermined threshold, for example, the generation capacity of the distribution entity 804, the process 900 moves to block 915.

Figure 9B:
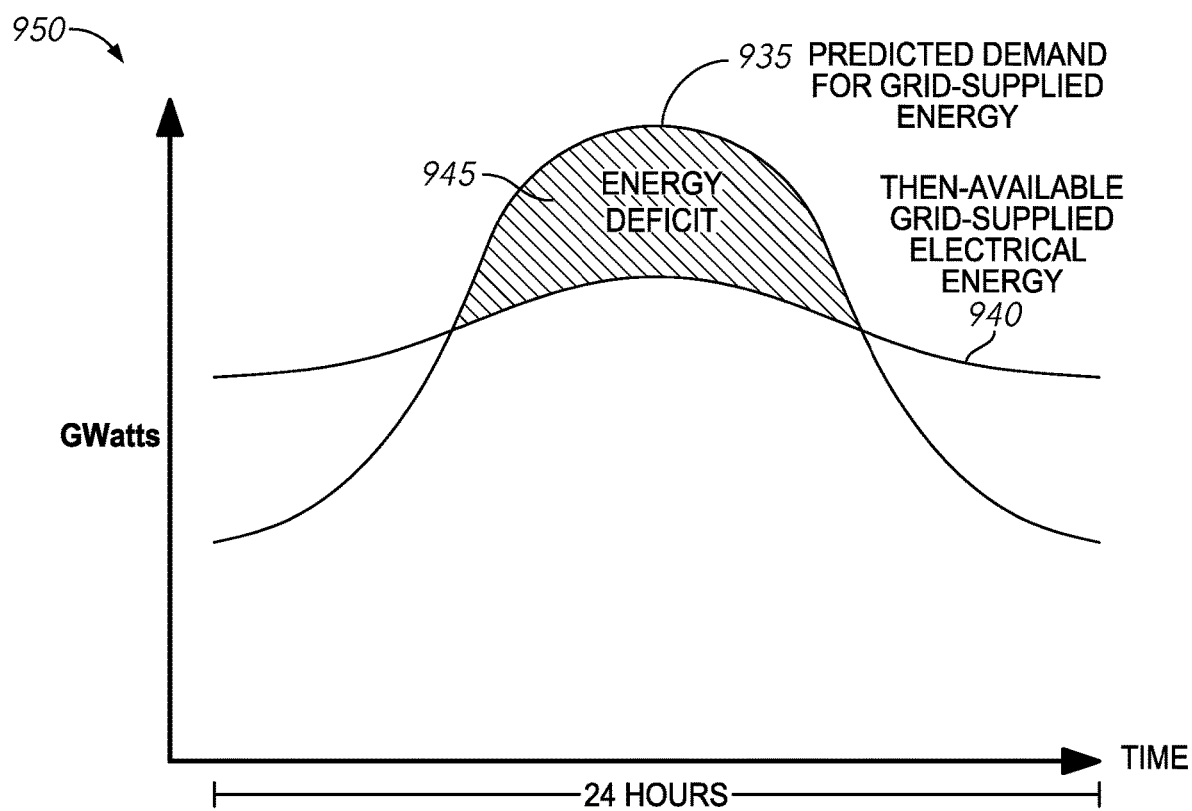
FIG. 9B is a graph illustrating the energy deficit between the predicted demand for grid-supplied electrical energy and the then-available grid-supplied electrical energy, according to certain embodiments.

FIG. 9B is a graph 950 illustrating the energy deficit between the predicted demand for grid-supplied electrical energy and the then-available grid-supplied electrical energy, according to certain embodiments. Electrical energy in Gigawatts is shown on the y-axis, and time is shown on the x-axis. For example, trace 935 illustrates the predicted demand for grid-supplied electrical energy, expressed as load or watts, for a next 24-hour period. In an embodiment, the distribution entity 804 predicts the demand for grid-supplied electrical energy for a next 24-hour period based at least in part on one or more of a historical demand for grid-supplied electrical energy for a similar day of the week, such as a weekday, a weekend, or a holiday, with similar weather, the predicted weather for the next time period, and the like. Trace 935 indicated that the demand is greater around the middle of the 24-hour period. Trace 940 illustrates the energy available from the distribution entity 804 for the next 24-hour period. The area under trace 935 bounded by trace 940 illustrates the difference between the predicted demand for grid-supplied electrical energy and the then-available grid supplied electrical energy from the distribution entity 804. This is the energy deficit 945 and represents the electrical power in Gigawatt hours that the distribution entity 804 will not be able to supply to meet the predicted demand for grid-supplied electrical energy for a portion of the 24-hour period.

Referring to FIG. 9A, at block 915, the distribution entity 804 accesses the database 810 and aggregates excess capacities of the excess energy. The number of PPPs 812 in the aggregation can be based on the additional amount of electrical energy needed for the high power usage in the next 24-hour period and can be neighborhoods, block of homes, regions of homes, etc. The number of PPPs 812 in the aggregation can be as large as needed to provide revise power generation to avoid expensive additional generation costs or to avoid reducing the energy available to residences (brown outs). For example, the distribution entity 804 identifies a sub-group of PPP 812 that each have sufficient excess capacity to power the associated residence from the starting time to the ending time. The distribution entity 804 further identifies a portion of the sub-group of PPPs 812 that together have an aggregate magnitude of excess capacity equal to or greater than the energy deficit magnitude At block 920, each PPP 812a-812n in the aggregation (the identified sub-group of PPPs 812) receives a command, such as a grid-disconnect command from the distribution entity 804 via the network 808 instructing each PPP 812a-812n in the aggregation to disconnect the associated battery storage 408 from the electrical grid for a specified period of time to prevent the associated battery storage 408 from receiving electrical energy from the electrical grid for the specified period of time. For example, the specified period of time may correspond to the period of predicted high energy usage for the distribution system 804.

In other embodiments, the distribution entity 804 can divide the PPPs 812a-812n into two or more groups based on the excess capacity of each PPP 812a-812n. The distribution entity 804 can command or send an offer to each group of the PPPs 812a-812n to disconnect from the electrical grid for a different portion of the specified period of time. The distribution entity 804 can send a command or communicate electronically with the respective PPPs 812a-812n to determine if one or more of the PPPs 812a-812n have sufficient storage to disconnect from the electrical grid based on the stored energy and actual use at the relevant time for the respective PPP 812a-812n. For example, PPPs 812d-812m may not have sufficient excess energy capacity to supply electrical energy to the residence for the entire specified period of time, but may be able to disconnect from the electrical grid and supply the associated residence with electrical energy for half of the specified period of time. PPPs 812d-812g can be grouped in a first group and PPPs 812h-812m can be grouped in a second group. The first group of PPPs 812d-812g can receive an electronic communication to disconnect from the electrical grid for the first half of the specified period of time. The second group of PPPs 812h-812m can receive an electronic communication to disconnect from the electrical grid for the second half of the specified period of time. The first and second halves of the specified period of time may be specified start and stop times. In other embodiments, the PPPs 812a-812n can be divided into more than two groups and the specified period of time can be proportioned accordingly.

At block 925, the controllers 402 cause the charger control switches 412 to disconnect the PPP 812 from the electrical power grid in response to receiving the grid-disconnect command. In aggregation, the PPPs 812 disconnect from the electrical power grid. For example, each PPP of the identified portion of the sub-group of PPPs 812 disconnects the associated battery storage 408 from the electrical grid to prevent the associated battery storage 408 from receiving electrical energy during the period of time. Each PPP of the identified portion of the sub-group of PPPs 812 provides electrical energy to the associated residence 606, 706, 806, from the associated battery storage 408 during the period of time. In an embodiment, in the event that there is a grid failure, the PPP 812 will 'automatically' disconnect, from the electrical power grid and operate as an isolated generator providing power to the residential load 606, 706, 806. All energy comes from the associated battery storage 408. Solar or wind, if available, will continue to provide energy as it is generated by the solar or wind.

At block 930, at the end of the specified time, the PPPs 812 resume their charging profiles 752, 754 to charge the battery storage 408 from the electrical power grid, if needed. In an embodiment, after the expiration of the period of time, each PPP of the identified portion of the sub-group of PPPs 812 reconnects the associated battery storage 408 to the electrical grid, by closing the charger control switch 412 for example, to receive electrical energy from the electrical grid.

Thus, process 900 illustrates inverse power generation method to use a personal power plant for inverse energy generation by aggregating the excess energy stored by a plurality of personal power plants.

Example

Referring to FIG. 2B, trace 252 illustrates the electrical load L2 252 of the residence 206 for a 24-hour period. The residence 206 may include a 4 kWatt electrical service. For example, residence 206 may be associated with a PPP 400 that predicts that residence 206 will use 3 kWatts over the next 24-hour period for a predicted power usage of 72 kWatt hours for the next 24-hour period. Further, the battery storage 408 of the PPP 400 can supply 100 kWatt hours of electrical power. Thus PPP 400 associated with residence 206 has an excess capacity of 28 kWatt hours for the next 24-hour period. Further, the PPP 400 can also predict that the residence 206 will use 1 kWatt of electrical energy between the hours of 1:00 PM and 4:00 PM, or 3 kWatt hours.

The magnitude of the excess capacity, 28 kWatt hours in this example, from residence 206, along with the magnitudes of the excess capacities from a plurality of other residences 806, each associated with a PPP 812 and battery storage 408 are provided to the distribution entity 804 and stored in the database 810.

Referring to FIG. 9B, area 945 represents the energy deficit that the distribution entity 804 has predicted will occur in the next 24-hour period. For example, the distribution entity 804 may predict that between 1:00 PM and 4:00 PM, the demand for electrical power will be 10 Gigawatts, or 30 Gigawatt hours. This can be represented by the area under trace 935, between the hours of 1:00 PM and 4:00 PM in the next 24-hour period of graph 950. The distribution entity 804 may determine that the available electrical energy generated by the distribution entity 804 between the hours of 1:00 PM and 4:00 PM in the next 24-hour time period is 9.5 Gigawatts, or 28.5 Gigawatt hours. This can be represented by the area under trace 940, between the hours of 1:00 PM and 4:00 PM in the next 24-hour period of graph 950. The energy deficit is 30 Gigawatt hours−28.5 Gigawatt hours=1.5 Gigawatt hours.

To avoid increasing energy generation, the distribution entity 804 determines a sub-group of the plurality of PPPs 400, 812 that have excess capacity. For example, the distribution entity 804 can search within the database 810 to determine a sub-group of PPPs 400, 812 that has excess capacity for the next 24-hour period. In this example, the PPP 400 associated with residence 206 has an excess capacity of 28 kWatt hours. Within this sub-group of PPPs 400, 812 with excess capacity, the distribution entity 804 will send the grid-disconnect command to a portion of the sub-group. The portion of the sub-group of PPPs 400, 812 that receives and accepts the grid-disconnect command will not draw power from the electrical grid for the amount of time that the grid-disconnect command is effective. In this example, the residences 206, 806 may use, on average 3 kWatt hours of electrical power between the hours of 1:00 PM and 4:00 PM for the next 24-hour period and the energy deficit for the same time period is 3 Gigawatt hours. The distribution entity 804 determines how many PPPs 400, 812 comprise the portion of the sub-group of PPPs 400, 812 by dividing the energy deficit 945 by an estimated amount of energy that will not be used by the PPP 400, 812 during the deficit time period. For example, 1.5 Gigawatt hours deficit/ 3 kWatt hours per PPP=500,000 PPPs 400, 812 (the number of PPPs 400, 812 in the portion of the sub-group). In an embodiment, the distribution entity 804 adds an additional percentage, such as 10%, 15% or the like, to the calculation.

In other words, in this example, when the 500,000 PPPs 400, 812 disconnect from the electrical grid between 1:00 PM to 4:00 PM within the next 24-hour period, the predicted electrical power demand on the electrical grid will be reduced by 500,000×3 kWatt hours=1.5 Gigawatt hours between 1:00 PM to 4:00 PM and the 1.5 Gigawatt hours of energy deficit will be reduced accordingly, to approximately zero. The above example is for illustrative purposes and it is contemplated that the distribution entity 804 will include a margin of error in the calculations, such as increasing the size of the portion of the sub-group of the PPPs 400, 812 with excess capacity.

Advantageously, "inverse energy generation" decreases grid demand, which reduces costs. Inverse energy generation generates electrical energy locally, which reduces transmission and distribution losses, which can be effectively zero. In an aspect, there are unrecoverable grid losses for the energy that has already been stored. Inverse energy generation reduces a need to fire up peaker plants, such as coal-fired peaker plants. Less fossil fuel, such as gas and coal, is burned, resulting in less carbon produced. Lower generation costs result in less cooling water used by power generation facilities. Distributed generation and inverse energy generation conserve water as well as fuel.

Terminology

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding whether these features, elements, and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method of using energy storage capacity of a personal power plant, the method comprising:
    with the personal power plant associated with a residence and battery storage,
        predicting energy usage of the residence for a next time period;
        determining an excess capacity magnitude, the excess capacity magnitude being a predicted charged capacity of the battery storage at a starting time less an associated predicted energy usage of the residence from the starting time to an ending time within the next time period, the excess capacity magnitude indicating that the personal power plant has an excess capacity sufficient to power the residence from the starting time to the ending time;
        alternatively selecting an electrical grid or the battery storage to provide the electrical energy to the associated residence, using a transfer switch;
        allowing and inhibiting the battery storage to receive grid-supplied electrical energy from the electrical grid using a charger control switch;
        receiving a grid-disconnect command over a network when a predicted demand for grid-supplied electrical energy from the electrical grid of a large-scale power generation system exceeds available grid-supplied electrical energy from the starting time to the ending time; and
        in response to receiving the command, by the charger control switch, isolating the personal power plant from the electrical grid of the large-scale power generation system so that the battery storage disposed in the personal power plant is inhibited from receiving the grid-supplied electrical energy from the electrical grid,
    wherein the battery storage provides stored electrical energy to the residence from the starting time to the ending time.

2. The method of claim 1 further comprising after the ending time, allowing, with the personal power plant, the battery storage to receive the grid-supplied electrical energy from the electrical grid.

3. The method of claim 2 wherein allowing the associated battery storage to receive the grid-supplied electrical energy from the electrical grid comprises reconnecting the associated battery storage to the electrical grid.

4. The method of claim 1 wherein the network is the Internet.

5. The method of claim 1 wherein the personal power plant includes a charging circuit, at least one battery, an inverter, a transfer switch, and one or more hardware processors.

6. The method of claim 1 wherein the personal power plant is an independently-owned personal power plant.

7. The method of claim 1 wherein the grid-disconnect command is transmitted by an electrical utility.

8. The method of claim 1 further comprising determining, with the independent personal power plant, a charging schedule based at least in part on the predicted energy usage of the associated residence.

9. The method of claim 8 wherein allowing the associated battery storage to receive the grid-supplied electrical energy from the electrical grid comprises charging the associated battery storage according to the charging schedule.

10. The method of claim 1 further comprising determining, with the independent personal power plant, a magnitude of excess capacity.

11. The method of claim 10 wherein the magnitude of excess capacity is a predicted charged capacity of the associated battery storage at a starting time less the predicted energy usage of the associated residence from the starting time to an ending time of the at least a portion of the next time period.

12. A personal power plant associated with a residence, the personal power plant comprising:
    battery storage configured to store electrical energy received from an electrical grid of a large-scale power generation system and provide the stored electrical energy to the residence;
    a transfer switch configured to alternatively select the electrical grid or the battery storage to provide the electrical energy to the associated residence;
    a charger control switch configured to allow the battery storage to receive grid-supplied electrical energy from the electrical grid and to inhibit the battery storage from receiving the grid-supplied electrical energy from the electrical grid; and
    a controller including memory storing executable instructions and one or more hardware processors in communication with the memory, wherein the one or more computer processors are configured to execute the executable instructions to at least:
        predict energy usage of the residence for a next time period;
        determine an excess capacity magnitude, the excess capacity magnitude being a predicted charged capacity of the battery storage at a starting time less an associated predicted energy usage of the residence from the starting time to an ending time within the next time period, the excess capacity magnitude indicating that the personal power plant has an excess capacity sufficient to power the residence from the starting time to the ending time;
        receive a grid-disconnect command over a network when a predicted demand for grid-supplied electrical energy from the electrical grid of the large-scale power generation system exceeds available grid-supplied electrical energy from the starting time to the ending time; and
    in response to receiving the command, cause the charger control switch to isolate the personal power plant from the electrical grid of the large-scale power generation system so that the battery storage disposed in the personal power plant is inhibited from receiving the grid-supplied electrical energy from the electrical grid, wherein the battery storage provides stored electrical energy to the residence from the starting time to the ending time.

13. The personal power plant of claim 12 wherein, after the ending time, the one or more computer processors are configured to execute the executable instructions to further cause the charger control switch to allow the battery storage to receive grid-supplied electrical energy from the electrical grid.

14. The personal power plant of claim 12 further comprising a charging circuit, at least one battery, and an inverter.

15. The personal power plant of claim 12 wherein the one or more computer processors are configured to execute the executable instructions to further determine a charging schedule based at least in part on the predicted energy usage of the residence.

16. The personal power plant of claim 15 wherein the one or more computer processors are configured to execute the executable instructions to further cause the charger control switch to allow the battery storage to receive the grid-supplied electrical energy from the electrical grid to charge the battery storage according to the charging schedule.

* * * * *